Feb. 21, 1956 L. O. FLOYD ET AL 2,735,909
WARNING SIGNAL FOR HYDRAULIC BRAKE SYSTEMS
Filed Oct. 13, 1952
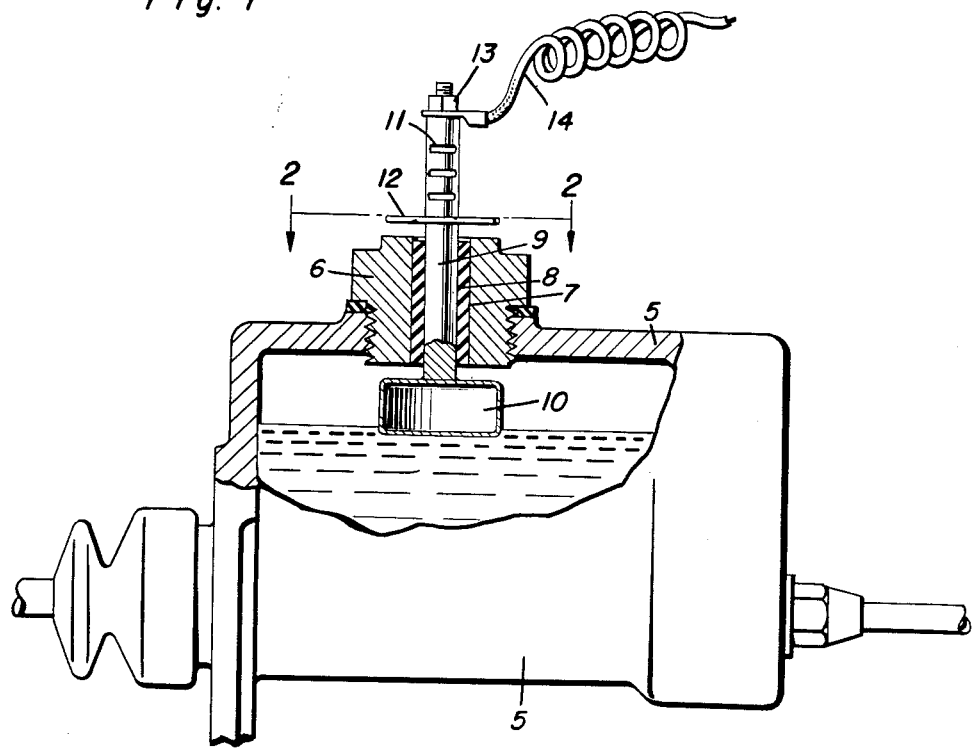
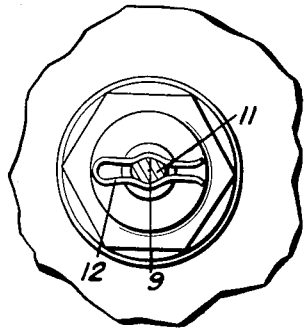
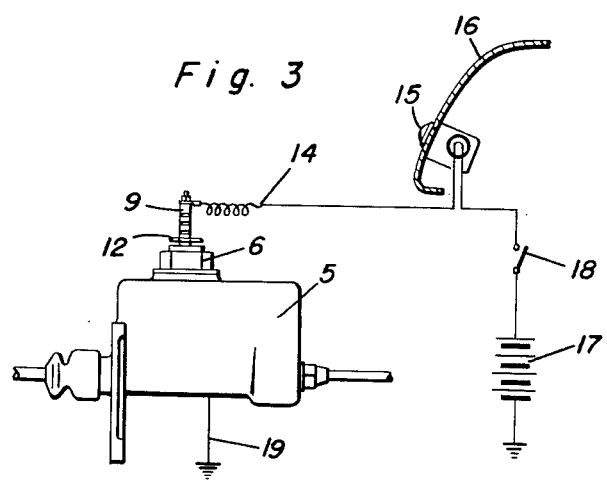
Leldon O. Floyd
Thomas O. Manning, Sr.
INVENTORS.

United States Patent Office 2,735,909
Patented Feb. 21, 1956

2,735,909
WARNING SIGNAL FOR HYDRAULIC BRAKE SYSTEMS

Leldon O. Floyd and Thomas O. Manning, Sr., San Angelo, Tex.

Application October 13, 1952, Serial No. 314,422

1 Claim. (Cl. 200—84)

The present invention relates to new and useful improvements in warning signals for hydraulic brake systems of motor vehicles to indicate a dangerously low level of the brake fluid in the master cylinder of the brakes.

An important object of the invention is to provide an electrical signaling device, which in its association with the master cylinder will automatically warn the driver of the vehicle when the fluid in the cylinder drops to a dangerous operating level.

Another object is to provide a float operated switch in the master cylinder which may be adjusted to close a circuit at different levels of the fluid, according to the setting of the contact for the switch.

A further object is to provide a device of this character of simple and practical construction, which is efficient and reliable in operation, relatively inexpensive to manufacture, and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a vertical sectional view of the top of a master cylinder showing the float controlled switch therein;

Figure 2 is a sectional view taken on a line 2—2 of Figure 1; and

Figure 3 is a side elevational view of the master cylinder and showing the circuit diagram for the signal lamp.

Referring now to the drawing in detail, wherein for the purpose of illustration we have disclosed a preferred embodiment of our invention, the numeral 5 designates the master cylinder of a type commonly used with a hydraulic brake system and provided with a filler plug or cap 6. Plug 6 is formed with a vertical bore 7 provided with an insulation lining sleeve 8 and in which a float stem 9 is vertically slidable. A float 10 is carried at the lower end of stem 9 to be raised or lowered by brake fluid contained in cylinder 5 and the stem projects upwardly above plug 6 and is formed at its diametrically opposite sides with transverse grooves or notches 11 at vertically spaced intervals and adapted to receive the legs of a substantially U-shaped resilient wire clip or pin 12 which bridges the top of the insulation sleeve 8 to contact the top of the plug when the float is lowered.

The upper end of stem 9 is threaded to receive a terminal nut 13 for attaching a circuit wire 14 thereto leading to a signal lamp 15 mounted on the instrument panel 16 of a motor vehicle and the circuit is connected with a suitable source of current, such as the battery 17 of the vehicle, and the circuit may also include a control switch 18.

In the operation of the device, the contact pin 12 is adjusted in the notches or grooves 11 of stem 9 at a predetermined setting and the pin is held above the plug 6 by float 10 when the fluid in the cylinder 5 is at a safe operating level. Cylinder 5 is provided with a suitable ground connection 19 and the cylinder 5, plug 6 and stem 9 are of conductive material so that should the level of the fluid in the cylinder drop to a dangerous level, the float 10 and the stem 9 will drop and lower contact pin 12 to close the circuit with the plug 6 and thus energize lamp 15 to warn the driver of the unsafe condition of the brake system.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claim.

Having described the invention, what is claimed as new is:

In a liquid level chmaber of the class described, a chamber, a float in the chamber and having a rod slidable in the top thereof and projecting above the chamber, said rod and said chamber being of electrically conductive material, insulation means between the rod and the chamber, said rod being adapted for connection in a circuit with a signalling element, vertically spaced apart horizontal grooves formed in the sides of the rod and a U-shaped spring clip secured in a selected groove to support the clip in a straddling vertically adjusted position to the outer end of the rod and maintained in an elevated position above the top of the chamber by the float, said clip being lowered to engage the top of the chamber in a circuit closing position upon a predetermined lowering movement of the float.

References Cited in the file of this patent
UNITED STATES PATENTS

| | | |
|---|---|---|
| 1,003,455 | Hardwick | Sept. 19, 1911 |
| 1,291,858 | Hanna | Jan. 21, 1919 |
| 1,359,866 | Bijur | Nov. 23, 1920 |
| 1,411,947 | Whittington | Apr. 4, 1922 |
| 1,963,123 | Flynn | June 19, 1934 |
| 2,433,710 | Schleicher | Dec. 30, 1947 |
| 2,479,503 | Moore | Aug. 16, 1949 |
| 2,520,237 | Cleray | Aug. 29, 1950 |
| 2,663,772 | Cochrane | Dec. 22, 1953 |